US009975982B2

(12) United States Patent
Batra et al.

(10) Patent No.: US 9,975,982 B2
(45) Date of Patent: May 22, 2018

(54) STAIN RESISTANT ARTICLE WITH OLEFIN BLOCK COPOLYMER AND PROCESS

(71) Applicant: Dow Global Technologies LLC, Midland, MI (US)

(72) Inventors: Ashish Batra, Zionsville, IN (US); Raymond L. Laakso, Jr., St. Francisville, LA (US); Lisa S. Madenjian, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 570 days.

(21) Appl. No.: 14/401,587

(22) PCT Filed: Jun. 21, 2013

(86) PCT No.: PCT/US2013/047013
§ 371 (c)(1),
(2) Date: Nov. 17, 2014

(87) PCT Pub. No.: WO2014/004287
PCT Pub. Date: Jan. 3, 2014

(65) Prior Publication Data
US 2015/0158965 A1 Jun. 11, 2015

Related U.S. Application Data

(60) Provisional application No. 61/666,017, filed on Jun. 29, 2012.

(51) Int. Cl.
| | |
|---|---|
| *C08F 293/00* | (2006.01) |
| *C08L 23/04* | (2006.01) |
| *C08L 23/10* | (2006.01) |
| *C08L 23/14* | (2006.01) |
| *C08L 53/00* | (2006.01) |
| *G01M 99/00* | (2011.01) |
| *B25G 1/04* | (2006.01) |
| *B25G 3/00* | (2006.01) |
| *B25G 3/18* | (2006.01) |
| *B25G 3/36* | (2006.01) |

(52) U.S. Cl.
CPC ............. *C08F 293/00* (2013.01); *B25G 1/04* (2013.01); *B25G 3/00* (2013.01); *B25G 3/18* (2013.01); *B25G 3/36* (2013.01); *C08L 23/04* (2013.01); *C08L 23/10* (2013.01); *C08L 23/14* (2013.01); *C08L 53/00* (2013.01); *G01M 99/008* (2013.01); *Y10T 16/473* (2015.01); *Y10T 16/4719* (2015.01); *Y10T 16/498* (2015.01); *Y10T 403/595* (2015.01); *Y10T 403/68* (2015.01); *Y10T 403/70* (2015.01); *Y10T 428/13* (2015.01); *Y10T 428/31938* (2015.04)

(58) Field of Classification Search
CPC ........ A47J 43/28; A47J 43/283; A47J 43/288; A47J 43/06; A47J 43/07; A47J 43/18; A47G 21/04; A47G 21/045; A61C 13/0028; C08F 293/00; C08F 293/005; C08L 23/04; C08L 23/0815; A47L 17/06
USPC ....... 294/7; 433/140, 141; 30/142, 324, 325; 15/235.4–235.8, 236.01–236.1, 237; 600/570
See application file for complete search history.

(56) References Cited

U.S. PATENT DOCUMENTS

| | | | |
|---|---|---|---|
| 4,363,841 A * | 12/1982 | Snow | B32B 15/08 383/107 |
| 4,798,081 A | 1/1989 | Hazlitt et al. | |
| 4,969,268 A * | 11/1990 | Kelly, III | A47J 43/288 16/110.1 |
| 7,592,397 B2 | 9/2009 | Markovich et al. | |
| 7,608,668 B2 | 10/2009 | Li Pi Shan et al. | |
| 7,671,106 B2 | 3/2010 | Markovich et al. | |
| 7,858,706 B2 | 12/2010 | Arriola et al. | |
| 2003/0097759 A1 * | 5/2003 | Bond | A47G 21/02 30/340 |
| 2006/0105125 A1 | 5/2006 | Musgrave et al. | |
| 2006/0199030 A1 * | 9/2006 | Liang | C08L 23/0815 428/515 |
| 2006/0199908 A1 | 9/2006 | Cheung et al. | |
| 2006/0199912 A1 | 9/2006 | Fuchs et al. | |
| 2007/0112127 A1 * | 5/2007 | Soediono | C08L 23/0815 524/543 |
| 2004/0171724 A1 | 9/2009 | Seip et al. | |
| 2009/0324914 A1 | 12/2009 | Liang et al. | |
| 2010/0298515 A1 * | 11/2010 | Marchand | C08F 297/083 526/336 |

(Continued)

FOREIGN PATENT DOCUMENTS

| | | |
|---|---|---|
| JP | H07118490 A | 5/1995 |
| WO | 2006/102016 A2 | 9/2006 |

(Continued)

OTHER PUBLICATIONS

Potemkin, Physical Review E, Jun. 1998, vol. 57, No. 6, pp. 6902-6912.

(Continued)

*Primary Examiner* — Lee E Sanderson
(74) *Attorney, Agent, or Firm* — Husch Blackwell LLP

(57) ABSTRACT

The present disclosure provides a food contact article. The food contact article includes a polymeric composition composed of a neat olefin block copolymer. The food contact article exhibits a total color change value, ΔE, of less than 20. The polymeric composition provides an article that is suitable for food contact application, the article having softness and stain resistance.

7 Claims, No Drawings

(56) References Cited

U.S. PATENT DOCUMENTS

2012/0070601 A1* 3/2012 Qian ............... C08L 23/06
428/36.92
2012/0222318 A1 9/2012 Toh et al.
2014/0141228 A1 5/2014 Fuchs et al.

FOREIGN PATENT DOCUMENTS

WO       2009/097560 A1    8/2009
WO   WO 2010135244 A2 * 11/2010   ............. C06L 23/06

OTHER PUBLICATIONS

Dobrynin, J. Chem. Phys., Dec. 1997, 107(21), pp. 9234-9238.
Wild, L., et al., J. Polym. Sci., vol. 20, 1982, pp. 441-455.
Randall, J.C., JMS-Rev. Macromol. Chem. Phys., C29, 1989, pp. 201-317.
Williams et al., J. Polm. Sci., Polym. Let., vol. 6, 1968, pp. 621-624.

\* cited by examiner

STAIN RESISTANT ARTICLE WITH OLEFIN BLOCK COPOLYMER AND PROCESS

FIELD

The present disclosure is directed to food contact articles composed of neat olefin block copolymer and the food contact articles exhibit stain resistance.

BACKGROUND

The use of plastics in housewares continues to grow. In food contact applications, food stain imparted on plastic articles is problematic. Staining is unsightly and detracts from the appearance of the article. The poor appearance of a food stained plastic article oftentimes compels the consumer to throw away the article pre-maturely. Conventional approaches to resist staining have drawbacks. Adding a stain resistant layer to an article adds complexity to production and increases the cost of the article. It is known to increase the crystallinity of a polymer to increase its stain resistance. However, increasing polymer crystallinity simultaneously decreases polymer flexibility and decreases polymer softness.

The art therefore recognizes the need for polymers that exhibit improved stain resistance. In particular, a need exists for polymeric food contact articles with improved stain resistance.

SUMMARY

The present disclosure is directed to food contact articles resistant to food staining.

In an embodiment, a food contact article is provided. The food contact article includes a polymeric composition composed of a neat olefin block copolymer. The food contact article exhibits a total color change value, ΔE, of less than 20. The polymeric composition provides an article that is suitable for food contact applications, the article also having a balance of softness and stain resistance.

The present disclosure provides a process. In an embodiment, the process includes providing a food contact article. The food contact article includes the neat olefin block copolymer. The process includes contacting the food contact article with a staining comestible and removing the staining comestible from the food contact article. The process further includes exhibiting, with the food contact article, a total color change, ΔE, of less than 20.

DETAILED DESCRIPTION

The present disclosure provides an article. The article is a food contact article and includes a polymeric composition. The polymeric composition is composed of a neat olefin block copolymer and an optional blend component. The food contact article has a total color change, ΔE, of less than 20. The total color change is evaluated when the food contact article is contacted with a comestible, such as a staining comestible in particular as described herein.

The article is a food contact article. A "food contact article," as used herein, is an article or a material intended for use in contact with food. In an embodiment, the food contact article complies with United States Food and Drug Administration (FDA) Code of Federal Regulations (CFR) 37 CFR § 177, or foreign equivalent thereto. The article can be a thermoformed article, an extruded article, a blow molded article, an injection molded article, an overmolded article, or any combination thereof. Nonlimiting examples of suitable food contact articles include containers, caps, cups, gaskets, bottles, corks, utensils (knife, fork, spoon), dishware (plate, bowl, dish, saucer, tray), cookware (spatula, mixer), kitchenware and home appliance panels/shelves for refrigerator, freezer, or dishwasher.

1. Olefin Block Copolymer

The food contact article includes a polymeric composition composed of a neat olefin block copolymer. The food contact article may be composed entirely from, or substantially entirely from, the polymeric composition. Alternatively, the polymeric composition may be a component of the food contact article. An "olefin block copolymer" (or "OBC"), as used herein, is a multi-block or segmented copolymer and includes two or more chemically distinct regions or segments (referred to as "blocks") joined in a linear manner, that is, a polymer comprising chemically differentiated units which are joined end-to-end with respect to polymerized ethylenic functionality, rather than in pendent or grafted fashion. In certain embodiments, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The olefin block copolymer is characterized by unique distributions of polydispersity index (PDI or $M_w/M_n$), block length distribution, and/or block number distribution due to the unique process making of the copolymers. More specifically, when produced in a continuous process, embodiments of the OBC may possess a PDI ranging from 1.7 to 8; or from 1.7 to 3.5; or from 1.7 to 2.5; and from 1.8 to 2.5; or from 1.8 to 2.1. When produced in a batch or semi-batch process, embodiments of the OBC may possess a PDI ranging from 1.0 to 2.9; or from 1.3 to 2.5; or from 1.4 to 2.0; or from 1.4 to 1.8.

In an embodiment, the OBC is an ethylene/α-olefin multi-block copolymer. The ethylene/α-olefin multi-block copolymer comprises a majority mole fraction of units derived from ethylene, the ethylene comprising at least 50 mol %, or at least 60 mol %, or at least 70 mol %, or at least 80 mol % with the remainder of the multi-block copolymer comprising the comonomer. The ethylene/α-olefin multi-block copolymer further includes ethylene and the co-polymerizable α-olefin comonomer in polymerized form, characterized by multiple (i.e., two or more) blocks or segments of two or more polymerized monomer units differing in chemical or physical properties (block interpolymer), and is a multi-block copolymer. In some embodiments, the multi-block copolymer may be represented by the following formula:

where n is at least 1, preferably an integer greater than 1, such as 2, 3, 4, 5, 10, 15, 20, 30, 40, 50, 60, 70, 80, 90, 100, or higher; "A" represents a hard block or segment; and "B" represents a soft block or segment. The A's and B's are linked in a linear fashion, not in a branched or a star fashion. "Hard" segments refer to blocks of polymerized units in which ethylene is present in an amount greater than 95 weight percent in some embodiments, and in other embodiments greater than 98 weight percent. In other words, the comonomer content in the hard segments is less than 5 weight percent in some embodiments, and in other embodiments, less than 2 weight percent of the total weight of the hard segments. In some embodiments, the hard segments comprise all, or substantially all, ethylene.

The "soft" segments, on the other hand, refer to blocks of polymerized units in which the comonomer content is greater than 5 weight percent of the total weight of the soft segments in some embodiments, greater than 8 weight percent, greater than 10 weight percent, or greater than 15 weight percent in various other embodiments. In some embodiments, the comonomer content in the soft segments may be greater than 20 weight percent, greater than 25 eight percent, greater than 30 weight percent, greater than 35 weight percent, greater than 40 weight percent, greater than 45 weight percent, greater than 50 weight percent, or greater than 60 weight percent in various other embodiments.

Because the respective distinguishable segments or blocks formed from two or more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In an embodiment, the quantity of extractable polymer using either a dialkyl ether or an alkane solvent is less than 10, or less than 7, or less than 5, or less than 2, percent of the total polymer weight.

In addition, the OBC disclosed herein possesses a PDI fitting a Schultz-Flory distribution rather than a Poisson distribution. The present OBC is produced by the polymerization process described in U.S. Pat. No. 7,858,706 and U.S. Pat. No. 7,608,668 which results in a product having both a polydisperse block distribution as well as a polydisperse distribution of block sizes. This results in the formation of OBC product having distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the ethylene/α-olefin multi-block copolymer is defined as having (A) Mw/Mn from 1.7 to 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2.$$

In an embodiment, the ethylene/α-olefin multi-block copolymer is defined as having (B) Mw/Mn from 1.7 to 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299(\Delta H) + 62.81 \text{ for } \Delta H \text{ greater than zero and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.

In an embodiment, the ethylene/α-olefin multi-block copolymer is defined as having (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d).$$

In an embodiment, the ethylene/α-olefin multi-block copolymer is defined as having (D) a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer.

In an embodiment, the ethylene/α-olefin multi-block copolymer is defined as having (E) a storage modulus at 25° C., G'(25° C.), and a storage modulus at 100° C., G' (100° C.), wherein the ratio of G'(25° C.) to G'(100° C.) is in the range of about 1:1 to about 9:1.

In an embodiment, the ethylene/α-olefin multi-block copolymer is defined as having (F) a molecular fraction which elutes between 40° C. and 130° C. when fractionated using TREF, characterized in that the fraction has a block index of at least 0.5 and up to about 1 and a molecular weight distribution, Mw/Mn, greater than about 1.3.

In an embodiment, the ethylene/α-olefin multi-block copolymer is defined as having (G) average block index greater than zero and up to about 1.0 and a molecular weight distribution, Mw/Mn greater than about 1.3.

The ethylene/α-olefin multi-block copolymer may have any combination of properties (A)-(G) set forth above.

Nonlimiting examples of suitable comonomer include straight-chain/branched α-olefin of 3 to 30 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, or 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In an embodiment, the comonomer in the ethylene/α-olefin multi-block copolymer is selected from propylene, butene, hexene, and octene.

In an embodiment, the ethylene/α-olefin multi-block interpolymer excludes styrene.

In an embodiment, the ethylene/α-olefin multi-block interpolymer is an ethylene/octene multi-block copolymer.

The OBC is neat. A "neat OBC" (or "neat olefin block copolymer"), as used herein, is an OBC that contains less than 1 wt %, or from zero, or greater than zero to less than 1.0 wt % oil. Weight percent is based on the total weight of the OBC. In an embodiment, the neat OBC contains zero, or greater than zero to less than 0.5 wt %, or less than 0.3 wt %, or less than 0.2 wt % oil.

Oil content for samples of polymers with a high degradation temperature (>300° C.) is measured by Thermal Gravimetric Analysis (TGA) using a TA Instruments Q500 Thermogravimetric Analyzer. A 20 mg sample is held isothermally at a temperature of 280° C. for 40 minutes to 60 minutes under nitrogen. Percent weight loss under these conditions is attributed to the amount, or percent, of oil added in the compositions. An "oil" is a material applied to polyolefin to soften the polyolefin. Nonlimiting examples of oil include aromatic oil, mineral oil, napththenic oil, a paraffinic oil, a triglyceride-based vegetable oil such as castor oil, a synthetic hydrocarbon oil such as polypropylene oil, a silicone oil, or any combination thereof. Oil is conventionally applied to thermoplastics to extend or otherwise increase flexibility. This practice is avoided with the present neat OBC. By way of example, the "neat OBC" contains less than 1 wt % (or none) of any of the aforementioned oils.

In an embodiment, the soft segment of the ethylene/octene multi-block copolymer includes from 5 mol % to 20 mol % units derived from octene. In a further embodiment, the soft segment of the ethylene/octene multi-block copolymer includes 5 mol %, or 7 mol %, or 9 mol %, or 11 mol %, or 13 mol %, or 15 mol % to 18 mol % to 20 mol % units derived from octene. The ethylene/octene multi-block copolymer has a density from 0.866 g/cc to 0.887 g/cc. The ethylene/octene multi-block copolymer has a melt index (MI) from 0.5 g/10 min, or 5.0 g/10 min, or 10.0 g/10 min, or 15 g/10 min, to 20 g/10 min, or 25 g/10 min, or 30 g/10

In an embodiment, the soft segment of the neat OBC has from 10 mol % to 20 mol % units derived from octene.

In an embodiment, the soft segment of the neat OBC has 11 mol % units derived from octene.

In an embodiment, the soft segment of the neat OBC has 13 mol % units derived from octene.

In an embodiment, the soft segment of the neat OBC has 18 mol % units derived from octene.

Applicant discovered that neat OBC is advantageous in food contact applications because neat OBC meets the overall migration test (EN 1186-2). The neat OBC also meets the hexane extractables test of not more than 5.5 as set forth in 37 CFR § 177.1520. The neat OBC also surprisingly improves stain resistance while maintaining softness.

In an embodiment, the polymeric composition has a Shore A hardness from 60, or 65, or 70, or 75 or 80 to 85 or 90, or 95. In a further embodiment, the polymeric composition is neat OBC, the neat OBC having a Shore A hardness in the aforementioned range.

2. Blend Component

The polymeric composition of the food contact article may optionally include a blend component. The blend component is compounded, mixed, or otherwise blended with the neat OBC to form the polymeric composition. The blend component may be a polyolefin such as a propylene-based polymer, an ethylene-based polymer, a propylene impact copolymer, and any combination thereof. It is understood that the blend component is a material other than OBC.

In an embodiment, the polyolefin is a polyethylene. The polyethylene is different than the OBC. The polyethylene is selected from ultra low density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultra high density polyethylene (UHDPE), and combinations thereof. In a further embodiment, the polyethylene has a density greater than 0.950 g/cc (i.e., a HDPE).

In an embodiment, the polyolefin is a polypropylene. The polypropylene is selected from random copolymer polypropylene (rcPP), impact copolymer polypropylene (ICPP), high melt strength polypropylene (HMS-PP), high impact polypropylene (HIPP), isotactic polypropylene (iPP), syndiotactic polypropylene (sPP), and combinations thereof.

3. Additives

The polymeric composition may optionally include one or more additives such as a filler. Nonlimiting examples of suitable fillers include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, and titanates.

The polymeric composition may optionally include one or more of the following additives: slip agents, anti-blocking agents, plasticizers, antioxidants, UV stabilizers, colorants or pigments, fillers, lubricants, antifogging agents, flow aids, coupling agents, cross-linking agents, nucleating agents, surfactants, solvents, flame retardants, antistatic agents, and combinations thereof.

In an embodiment, the polymeric composition is halogen-free.

In an embodiment, the polymeric composition is phthalate-free.

4. Stain Resistance

The stain resistance of the food contact article is measured by detecting the total color change, or $\Delta E$. The food contact article has a total color change value, $\Delta E$, of less than 20. The total color change value, $\Delta E$, is a measure of stain resistance.

The total color change, $\Delta E$, is determined as follows. The food contact article is placed in contact with a comestible. A "comestible," as used herein, is a food or a beverage. The comestible contacts the food contact article for four days (or 96 hours). The comestible is then removed from the food contact article. The food contact article after contact with this comestible is rinsed with water and dried.

A spectrometer is used to take color measurements of the food contact article (i) prior to and (ii) after contact with the comestible. The color measurements of the stained food contact article are then compared to a control food contact article (i.e., the food contact article prior to contact with the comestible).

Three color parameters are measured:

(i) $L^*$ is a measure of the lightness of the color ($L^*=0$ being black and $L^*=100$ being white);

(ii) $a^*$ is a green to red scale (negative values of $a^*$ being green and positive values of $a^*$ being red); and (iii) $b^*$ is a blue to yellow scale (negative values of $b^*$ being blue and positive values of $b^*$ being yellow).

The change for each color parameter $L^*$, $a^*$, and $b^*$ is calculated. The total color change, $\Delta E$, is determined by Equation (I) below.

$$\Delta L = L^*_{stained} - L^*_{control}$$

$$\Delta a = a^*_{stained} - a^*_{control}$$

$$\Delta b = b^*_{stained} - b^*_{control}$$

$$\Delta E = \sqrt{\Delta L^2 + \Delta a^2 + \Delta b^2} \qquad \text{Equation (I)}$$

In an embodiment, the total color change, ΔE, for the food contact article is from 0, or greater than 0, or 0.1, or 0.2, or 0.5, or 1.0, or 3.0, or 5.0, or 10 to 15, or less than 20.

Applicant discovered that (i) neat OBC, the neat OBC composed of (ii) ethylene/octene multi-block copolymer with (iii) 10 mol % to 20 mol % octene in the soft segment surprisingly yields an article that is stain resistant (ΔE less than 20), suitable for food contact (overall migration less than 10 mg/dm$^2$), and is soft (Shore A is 60 to 95).

In an embodiment, the comestible is a staining comestible. A "staining comestible," as used herein, is a deep-colored comestible with the ability to discolor a material with which it contacts. Nonlimiting examples of staining comestibles include coffee; tea; red wine; deep-colored sauces such as soy sauce, tomato-based sauce, barbeque sauce, and curry sauce; berries such as blueberries, blackberries, cherries, pomegranates, and other vibrant colored fruit; and condiments such as ketchup and mustard.

In an embodiment, the staining comestible is in contact with the food contact article and the total color change, ΔE, is less than 20.

In an embodiment, the staining comestible is ketchup and the food contact article has a total color change value, ΔE, from 0, or greater than 0, or 1, or 3, or 5, or 7 to less than 10.

In an embodiment, the staining comestible is mustard and the food contact article has a total color change value, ΔE, from 0, or greater than 0, or 1, or 3, or 5, or 7, or 10, or 13 to 15, or 17 or less than 20.

In an embodiment, the staining comestible is blueberry and the food contact article has a total color change value, ΔE, from 0, or greater than 0, or 0.1, or 0.2, or 0.3, to 0.5, or 0.7, or 1.0.

In an embodiment, the food contact article has an overall migration of less than 10 mg/dm$^2$, or from 0 mg/dm$^2$, or greater than 0 mg/dm$^2$ to 9 mg/dm$^2$, or less than 10 mg/dm$^2$. Overall migration (OM) is measured in accordance with EN 1186-2.

In an embodiment, the food contact article is an overmolded article. An "overmolded article," as used herein, is an article made by an injection molding process where a thermoplastic elastomer (such as the present neat OBC) is injection molded onto a material, typically a rigid material (such as polypropylene or other polyolefin). The overmolded thermoplastic elastomer forms a strong bond with the rigid material. An advantage of an overmolded article is that adhesive is not required to bond the thermoplastic elastomer to the rigid material.

In an embodiment, the food contact article is a spatula. The spatula blade is composed of the present polymeric composition containing neat OBC. The handle is composed of a rigid material such as wood, metal, or a rigid polymer such as polypropylene. In a further embodiment, the blade of the spatula contacts a food staining comestible.

In an embodiment, the food contact article is a container. The container contacts a staining comestible by holding or otherwise containing the staining comestible therein. The container has total color change value, ΔE, from 0, or greater than 0, or 1, or 3, or 5, or 7, or 10, or 13 to 15, or 17 or less than 20.

In an embodiment, the food contact article is a cup. The cup contacts a staining comestible by holding or otherwise containing the staining comestible therein. The cup has a total color change value, ΔE, from 0, or greater than 0, or 1, or 3, or 5, or 7, or 10, or 13 to 15, or 17 or less than 20.

In an embodiment, the food contact article is a utensil such as a fork, a spoon, a knife, and any combination thereof. The utensil contacts a staining comestible. The utensil has a total color change value, ΔE, from 0, or greater than 0, or 1, or 3, or 5, or 7, or 10, or 13 to 15, or 17 or less than 20.

The present food contact article may comprise two or more embodiments disclosed herein.

5. Process

The present disclosure provides a process. In an embodiment, the process includes providing a food contact article composed of the polymeric composition with the neat olefin block copolymer. The process includes contacting the food contact article with a staining comestible. The process includes removing the staining comestible from the food contact article and exhibiting, with the food contact article, a total color change, ΔE of less than 20, or from 0, or greater than 0 to less than 20.

In an embodiment, the process includes contacting the food contact article with ketchup and exhibiting, with the food contact article, a total color change value, ΔE, less than 10, or from 0, or greater than 0, or 1, or 3, or 5, or 7 to less than 10.

In an embodiment, the process includes contacting the food contact article with mustard and exhibiting, with the food contact article, a total color change, ΔE, less than 20, or from 0, or greater than 0, or 1, or 3, or 5, or 7, or 10, or 13 to 15, or 17 or less than 20.

In an embodiment, the contacting step of the process includes placing the staining comestible in a food contact article that is a container. In a further embodiment, the process includes storing the staining comestible in the container.

The present composition may comprise two or more embodiments disclosed herein.

DEFINITIONS

The terms "comprising", "including", "having" and their derivatives do not exclude the presence of any additional component or procedure. The term, "consisting essentially of" excludes any other component or procedure, except those essential to operability. The term "consisting of" excludes any component or procedure not specifically stated.

Test Methods

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; Determination of Branching Distributions in Polyethylene and Ethylene Copolymers, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™. 400 MHz spectrometer or a Varian Unity Plus™ 400 MHz spectrometer, corresponding to a $^{13}C$ resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989).

CRYSTAF Standard Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

Density is measured in accordance with ASTM D 792.

DSC Standard Method

Differential Scanning calorimetry (DSC) results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

GPC Method

The gel permeation chromatographic (GPC) system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)): $M_{polyethylene} = 0.431\,(M_{polystyrene})$.

Polyethylene equivalent molecular weight calculations are performed using Viscotek TriSEC software Version 3.0.

Measurement of Weight Percent of Hard Segment and Soft Segment—the soft segment weight percentage (and thus the hard segment weight percentage) can be measured by DSC or NMR as disclosed in U.S. Pat. No. 7,608,668 col. 57 line 30 through col. 63 line 12.

Melt flow rate, or MFR is measured in accordance with ASTM D 1238, Condition 230° C./2.16 kg.

Melt index, or MI, is measured in accordance with ASTM D 1238, Condition 190° C./2.16 kg.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat# Z50WP04750). The filtrated fractions are dried overnight in a vacuum oven at 60° C. and weighed on an analytical balance before further testing.

Shore A hardness is measured in accordance with ASTM D2240 with the weight applied for 10 seconds prior to recording the hardness value. Shore A hardness is measured on molded plaques in accordance with ASTM D 2240. This test method permits hardness measurements based on either initial indentation or indentation after a specified period of time, or both. In this case a specified time of 10 seconds is used.

Some embodiments of the present disclosure will now be described in detail in the following Examples.

EXAMPLES

1. Materials

Materials for examples and comparative samples are provided in Table 1 below.

TABLE 1

Materials

| Sample | Structure | Density (g/cc) | Shore A | MI | mol % octene in SS |
|---|---|---|---|---|---|
| Comparative Sample 1 100 phr SEBS 160 phr oil | SEBS | 1.00 | 85 | ~8 | — |
| Comparative Sample 2* 100 phr OBC 130 phr oil, 45 phr HDPE, 100 phr CaCO₃ | OBC is ethylene-octene multi-block copolymer | 1.06 | 65 | ~8 | — |
| Example 3 | Neat ethylene-octene multi-block copolymer | 0.877 | 69 | 0.5 | 18.0 |
| Example 4 | Neat ethylene-octene multi-block copolymer | 0.877 | 71 | 15.0 | 18.0 |
| Example 5 | Neat ethylene-octene multi-block copolymer | 0.877 | 77 | 0.5 | 13.0 |

SEBS = poly(styrene-(ethylene-co-butylene)-styrene)
SS = soft segment
*In CS2, OBC properties are - 0.866 g/cc, 0.5 MI, 18 mol % SS 2. Sample Preparation For stain resistance testing, hardness, and hexane extractables testing, samples are either compression or injected molded into plaques approximately 3 mm in thickness.

For overall migration testing, samples are compression molded into thin films 25 microns in thickness.

3. Test Methods

A. Hexane Extractables

Injection or compression molded plaques approximately 3 mm in thickness are cut into pieces approximately 10×18 mm in size. Each test sample consists of five rectangular pieces of plaque (3×10×18 mm) with a mass of approximately 2.4-2.6 g. For each test sample the initial mass is recorded. Each sample is then placed in hexane at 50° C. for 2 hr. The sample is then removed and dried under a N₂ stream. The final mass of the sample is recorded and the difference in the final and initial masses calculated. The wt % extracted is calculated as Equation(II):

$$\text{wt \% extracted} = \frac{m_{initial} - m_{final}}{m_{initial}} \quad \text{Equation (II)}$$

The wt % extracted data in the table below is normalized to that of the SEBS compound, Comparative Sample 1.

B. Overall Migration Oil Migration into Olive Oil (EN 1186-2)

Data in the table below is for films that are 25 microns in thickness. The data is normalized to that of the OBC compound with oil, Comparative Sample 2.

i Overall Migration

The overall migration (OM) test, which is also known as global migration, is one of the foundations of the European regulation to ensure that plastic materials and articles intended for contact with foodstuffs are suitable for the intended application. The purpose of the test is to ensure that the plastic is inert and does not give rise to ruining of the food. OM is a gravimetric determination with no requirement to identify the substances migrating. The rationale is that above a certain level, even the migration of risk-free substances should not be tolerated since they affect the quality of the food. The OM limit is an upper limit on the total quantity of all substances permitted to migrate. The overall migration limit is set at 10 mg/dm², expressed on the basis of the surface area of the plastic placed in contact with the food/simulant.

ii. Exposure

All migrations are performed by total immersion (double surface testing) in a beaker with a volume to surface ratio of 100 ml/dm². The migration tests have been carried out in triplicate with aqueous simulants (3% acetic acid, 10% ethanol and 50% ethanol) and in quadruplicate with simulant D (olive oil).

iii. Analytical Procedures

Overall Migration into Water (Simulant A).

After exposure of the sample to water during 10 days at 40° C. the simulant is evaporated to dryness and from the weight of the residue the migrations are calculated. The tests are carried out in triplicate.

C. Overall Migration into Olive Oil (EN 1186-2)

The sample is conditioned above CaCl₂ at ambient temperature until a constant weight is obtained and next exposed to the simulant during 10 days at 40° C. After exposure, the excess of oil is removed, then the samples are conditioned until a constant weight is obtained and reweighed. The simulant absorbed by the sample is extracted using pentane as solvent. After the extraction step, the pentane is evaporated, the residue (containing the extracted oil) is saponified, methylated and next injected into a gas chromatograph where separation and detection take place under the following conditions shown in Table 2.

TABLE 2

| Column | 30 m × 0.25 mm DB225 df = 0.25 μm |
|---|---|
| Oven temp | initial temp: 190° C. during 10 min<br>rate: 20° C./min<br>final temp: 220° C. during 20 min |
| Injection | 0.5 μL, split ratio 1:30 |
| Detection | Flame Ionization (FID) |

Quantification is accomplished using the external standard technique based on the combined peak ratios methyl ester/internal standard (2 gram of triheptadecanoin in 1 L cyclohexane) of calibration standards prepared by weighing amounts of oil in Erlenmeyer flasks. The calculated peak ratios of the standards are subjected to linear regression analysis and the oil concentration in the extracts is calculated from the resulting equation.

Migration into the olive oil is calculated by subtracting the mass of oil retained by the test specimen after removal from the olive oil, then subtracting this mass from the initial mass of the sample.

Table 3 below shows overall migration values for the present neat OBCs: Examples 3, 4, and 5. As shown in Table 3 (rightmost column), each of the neat OBCs, Examples 3, 4, and 5, complies with EN 1186-2 which requires OM to be less than 10 mg/dm$^2$.

TABLE 3

Overall Migration in Olive Oil during 10 days
at 40° C. by Total Immersion (film samples)

| Sample | Average amount of absorbed oil [mg/dm$^2$] | Migration (C16) in Olive Oil [mg/dm$^2$] | Overall Migration (C-total) in Olive Oil & 95% confidence limits* [mg/dm$^2$] |
|---|---|---|---|
| Example 3, 25 μm | 35 | 10.0 ± 1.5 | 7.3 ± 1.2 |
| Example 4, 25 μm | 31 | 5.2 ± 0.9 | 2.5 ± 0.7 |
| Example 5, 25 μm | 34 | 12.6 ± 1.0 | 9.8 ± 0.8 |

M (C-total) = Migration based on measurement of all the C16 + C18 triglycerides (saturated and unsaturated)
M (C16) = Migration based on measurement of C16:0 triglycerides (saturated)

In Table 4, each of Comparative Sample 1 (CS1) and Comparative Sample 2 (CS2) is used as a benchmark. CS1 is used as a benchmark for hexane extractables and is designated with a normalized hexane extractables value of 1.0. Example 3, 4, and 5 each show a normalized hexane extractable value less than 1.0. Table 4 shows that Example 3, 4, 5 each exhibits less hexane extractables than CS1 and are therefore superior to CS1 for food contact applications.

In Table 4, CS2 is used as a benchmark for olive oil extractables and is given a normalized olive oil extractable value of 1.0. Example 3, 4, and 5 each exhibits a normalized olive oil extractable value less than 1.0, indicating that Example 3, 4, and 5 exhibit less olive oil extractables than CS2 and are superior to CS2 for food contact applications.

TABLE 4

| | CS1 | CS2 | Example 3 | Example 4 | Example 5 |
|---|---|---|---|---|---|
| mol % octene soft segment in SS (from Table 1) | — | 18.0 | 18.0 | 18.0 | 13.0 |

TABLE 4-continued

| | | CS1 | CS2 | Example 3 | Example 4 | Example 5 |
|---|---|---|---|---|---|---|
| (Shore A) | | 85 | 65 | 69 | 71 | 77 |
| Hexane extractables (normalized) | | 1.00 | — | 0.01 | 0.49 | 0.00 |
| Olive Oil Extractables (normalized) | | — | 1.00 | 0.12 | 0.15 | 0.06 |
| Ketchup | ΔL | −3.2 | −2.2 | −2.5 | −2.4 | −1.6 |
| | Δa | 2.1 | 3.4 | 2.8 | 2.6 | 1.8 |
| | Δb | 8.5 | 5.9 | 9.1 | 8.1 | 7.6 |
| | ΔE | 9.3 | 7.1 | 9.8 | 8.8 | 7.9 |
| Mustard | ΔL | −11.6 | −13.4 | −1.6 | −2.2 | −2.2 |
| | Δa | 4.7 | 7.3 | −2.2 | −2.6 | −2.6 |
| | Δb | 32.2 | 32.6 | 14.9 | 17.4 | 12.9 |
| | ΔE | 34.5 | 36.0 | 15.1 | 17.7 | 13.4 |
| Blueberry | ΔL | −0.2 | 0.2 | −0.1 | −0.5 | −0.6 |
| | Δa | −0.1 | −0.1 | −0.2 | −0.2 | 0.0 |
| | Δb | 0.5 | 0.4 | 0.1 | 0.4 | 0.8 |
| | ΔE | 0.5 | 0.4 | 0.2 | 0.7 | 1.0 |

CS = comparative sample

D. Stain Resistance

Injection or compression molded plaques are covered with three different staining comestibles (ketchup, mustard, and pureed blueberries) and allowed to sit at room temperature for approximately 4 days. The staining comestibles are then rinsed off with water and the plaques dried by gently patting with paper towels. Color measurements are taken of the stained samples and of a control sample that had no staining comestible applied to it. Color measurements are obtained using a BYK-Gardner Color-view spectrometer with an observer angle of 2° and primary illuminant C. Color is recorded using the CIE L*, a*, b* color space where L* is a measure of the lightness of the color (L*=0 being black and L*=100 being white), a* is a green to red scale (negative values of a* being green and positive values of a* being red), and b* is a blue to yellow scale (negative values of b* being blue and positive values of b* being yellow).

Difference between the stained and unstained specimens are reported for all three color parameters (L*, a*, and b*) as described below. In addition, the total color change, ΔE as given by the Equation (I) below, is also reported.

$$\Delta L = L^*_{stained} - L^*_{control}$$

$$\Delta a = a^*_{stained} - a^*_{control}$$

$$\Delta b = b^*_{stained} - b^*_{control}$$

$$\Delta E = \sqrt{\Delta L^2 + \Delta a^2 + \Delta b^2} \qquad \text{Equation (I)}$$

Table 4 shows ΔE values for CS1 and CS 2 and Examples 3-5 of the present disclosure. Example 3, 4, and 5 each show improved stain resistance when compared to CS1 and CS2.

Compared to CS1 and CS2, Examples 3, 4, and 5 show improved stain resistance over a broad range of staining types and staining colors—deep-colored sauce (ketchup), vibrant-colored and staining fruit (blueberry), and yellow condiment (mustard). In addition, to the improved stain resistance, each of Example 3, 4, and 5 show improved food contact properties (lower hexane extractables and lower olive oil extractables) while maintaining softness (Shore A) compared to CS1 and CS2 as discussed above.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A food contact article comprising:
   a handle composed of a rigid material:
   a spatula blade overmolded onto the handle, the spatula having an unstained state before contact with a staining comestible and a stained state after 96 hours of contact with the staining comestible, the spatula blade comprising a polymeric composition having a shore A hardness of from 60 to 95;
   wherein said polymeric composition consists of a neat ethylene/octene multiblock copolymer having no oil, the neat ethylene/octene multiblock copolymer comprising hard segments and soft segments joined in a linear fashion and comprising from 10 mol % to 20mol % of units derived from octene in the soft segment;
   wherein the neat ethylene/octene multiblock copolymer has an overall migration of less than 10 mg/dm$^2$ as measured in accordance with EN 1186-2;
   wherein said spatula blade has a total color change value, $\Delta E$, of less than 20, after 96 hours of contact with the staining comestible; wherein $\Delta E = \sqrt{\Delta L^2 + \Delta a^2 + \Delta b^2}$, wherein $\Delta L$ is the difference in lightness between the stained and unstained article, $\Delta a$ is the difference in green to red scale between the stained and unstained article, and $\Delta b$ is the difference in the blue to yellow scale between the stained and unstained article as measured with a BYK-Gardner Color-view spectrometer.

2. The food contact article of claim 1 wherein the staining comestible is ketchup and the spatula blade has a total color change value, $\Delta E$, from 0 to less than 10.

3. The food contact article of claim 1 wherein the spatula blade consists of the polymeric composition consisting of the neat ethylene/octene multiblock copolymer.

4. The food contact article of claim 3 wherein the handle is composed of a material selected from the group consisting of wood, metal, and rigid polymer.

5. The food contact article of claim 4 wherein the handle is composed of a rigid polymer that is polypropylene.

6. The food contact article of claim 1 wherein the staining comestible is mustard and the spatula blade has a total color change value, $\Delta E$, from 0 to less than 10.

7. The food contact article of claim 1 wherein the staining comestible is blueberry and the spatula blade has a total color change value, $\Delta E$, from 0 to less than 10.

* * * * *